US009330572B2

(12) United States Patent
Takahashi

(10) Patent No.: US 9,330,572 B2
(45) Date of Patent: May 3, 2016

(54) VEHICLE WARNING DEVICE

(75) Inventor: Yoshihiko Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/408,414

(22) PCT Filed: Jun. 26, 2012

(86) PCT No.: PCT/JP2012/066260

§ 371 (c)(1),
(2), (4) Date: Dec. 16, 2014

(87) PCT Pub. No.: WO2014/002187

PCT Pub. Date: Jan. 3, 2014

(65) Prior Publication Data

US 2015/0116102 A1 Apr. 30, 2015

(51) Int. Cl.

| | |
|---|---|
| ***B60Q 1/00*** | (2006.01) |
| ***G08G 1/16*** | (2006.01) |
| ***G08G 1/00*** | (2006.01) |
| ***G08B 21/00*** | (2006.01) |
| ***G06F 17/10*** | (2006.01) |
| ***G01C 5/00*** | (2006.01) |
| ***G08B 5/38*** | (2006.01) |

(52) U.S. Cl.

CPC *G08G 1/166* (2013.01); *G08B 5/38* (2013.01); *G08G 1/163* (2013.01); *G08G 1/167* (2013.01)

(58) Field of Classification Search

None

See application file for complete search history.

(56) References Cited

U.S. PATENT DOCUMENTS 5,684,473 A * 11/1997 Hibino ............... B60K 31/0008 180/271
8,629,800 B2 * 1/2014 Anderson ................ B60Q 1/48 342/109
2010/0179719 A1 * 7/2010 Kimura ................ B60K 26/021 701/29.1
2011/0128139 A1 * 6/2011 Tauchi .................. B60K 35/00 340/439
2012/0323403 A1 * 12/2012 Okita .................... B60W 50/14 701/1
2014/0028451 A1 1/2014 Takahashi et al.

FOREIGN PATENT DOCUMENTS

| | | |
|---|---|---|
| DE | 10 2007 015 032 A1 | 1/2008 |
| JP | A-2003-16597 | 1/2003 |
| JP | A-2004-268720 | 9/2004 |
| JP | 2006-315489 A | 11/2006 |
| JP | A-2007-112297 | 5/2007 |
| JP | 2007-323598 A | 12/2007 |
| JP | 2008-254710 A | 10/2008 |
| JP | A-2009-251860 | 10/2009 |
| JP | A-2010-30354 | 2/2010 |
| JP | 2011-113275 A | 6/2011 |
| JP | B2-5435172 | 3/2014 |

* cited by examiner

*Primary Examiner* — Jennifer Mehmood

*Assistant Examiner* — Pameshanand Mahase

(74) *Attorney, Agent, or Firm* — Oliff PLC

(57) ABSTRACT

A warning control device is provided with a detection device for detecting a mobile body moving in a direction intersecting with the path of the host vehicle. The warning control device performs a warning operation when the host vehicle and the mobile body approach each other. The warning control device calculates the intersecting distance, which is the distance to the host vehicle from a predicted intersecting position between the path of the host vehicle and the path of the mobile body. The shorter the calculated intersecting distance, the earlier becomes the timing of the warning operation executed by the warning control device.

13 Claims, 6 Drawing Sheets

| | | ESTIMATED INTERSECTING DISTANCE X SHORT ← → LONG | | |
|---|---|---|---|---|
| THRESHOLD | THIRD THRESHOLD T3 (FOR HAZARD LAMPS) | T3L | T3M | T3S |
| | SECOND THRESHOLD T2 (FOR OUTPUT SUPPRESSION) | T2L | T2M | T2S |
| | FIRST THRESHOLD T1 (FOR AUTOMATIC BRAKING) | T1L | T1M | T1S |

↑ LONG — DETERMINATION TIME — ↓ SHORT

← DETERMINATION TIME →
LONG SHORT

VEHICLE WARNING DEVICE

TECHNICAL FIELD

The present invention relates to a vehicle warning device that detects a mobile object approaching a host vehicle and takes a warning action.

BACKGROUND ART

Various vehicle warning devices have been proposed that detect an obstacle existing in the path of a host vehicle and take a warning action if the obstacle and the host vehicle approach each other. It is desirable that such a warning action be timed to be taken as appropriately as possible. Thus, according to a device described for example in Patent Document 1, a warning is timed to be issued earlier as the speed of the host vehicle increases.

PRIOR ART DOCUMENTS

Patent Documents

Patent Document 1: Japanese Laid-Open Patent Publication No. 2003-16597

SUMMARY OF THE INVENTION

Problems that the Invention is to Solve

Obstacles in the path of the host vehicle are not limited to still objects but may also be mobile objects such as other vehicles. Such a mobile object does not always approach the host vehicle along the path of the host vehicle but may also approach the host vehicle in a direction intersecting the path of the host vehicle. As an example, a mobile object may pass by the host vehicle transversely in the path of the host vehicle after few seconds. It is desirable that a warning action be taken at appropriate timing against such approach of a mobile object.

Accordingly, it is an objective of the present invention to time a warning action to be taken appropriately when a host vehicle and a mobile object moving in a direction intersecting a path of a host vehicle and the host vehicle approach each other.

Means for Solving the Problems

To achieve the foregoing objective, the present invention provides a vehicle warning device is provided that includes a detecting unit that detects a mobile object moving in a direction intersecting a path of a host vehicle, a distance calculating unit that calculates an intersecting distance that is a distance to the host vehicle from a predicted intersecting position of the path of the host vehicle and a path of the mobile object, a warning unit that takes a warning action if the host vehicle and the mobile object approach each other, and a timing changing unit that advances the timing of execution of the warning action by a greater extent as the intersecting distance becomes shorter.

In the present invention, if a mobile object moving in the direction intersecting the path of the host vehicle is detected, the intersecting distance is calculated, which is the distance to the host vehicle from the predicted intersecting position of the path of the host vehicle and the path of the mobile object. As the intersecting distance becomes shorter, specifically, as the distance between the mobile object and the host vehicle becomes shorter when the mobile object passes by the host vehicle transversely and the risk for the mobile object and the host vehicle to approach each other excessively becomes higher, the warning action is taken at an earlier time. Thus, measures such as those for avoiding approach of the mobile object and the host vehicle can be taken at an earlier stage in response to higher risk of approach. As a result, in the present invention, when the mobile object moving in the direction intersecting the path of the host vehicle and the host vehicle approach each other, the warning action can be taken at appropriate timing. If the warning action is taken at an early stage while the risk of approach is not high, the driver of the host vehicle might experience a feeling of strangeness. In this regard, in the present invention, the warning action is timed to be taken appropriately in response to the risk of approach. This reduces strangeness the driver might experience.

The aforementioned predicted intersecting position and intersecting distance can be calculated by detecting the position, the moving direction, the speed and the like of the mobile object with the detecting unit and by detecting the moving direction, speed and the like of the host vehicle detected for example with a sensor and the like.

In accordance with one aspect of the present invention, the vehicle warning device includes a time calculating unit that calculates an intersecting time that is a time left for the mobile object to reach the predicted intersecting position. The warning unit takes the warning action if the intersecting time is the same as or shorter than a threshold, and the timing changing unit sets the threshold such that the shorter the intersecting distance, the longer the threshold becomes. In this case, if the intersecting time calculated by the time calculating unit becomes the same as or shorter than the threshold, the host vehicle and the mobile object are determined to be approaching each other excessively. In response, the warning action is taken. This threshold is set at a longer time as the intersecting distance becomes shorter. As a result, in response to higher risk for the mobile object and the host vehicle to approach each other excessively, the warning action is taken at an earlier time.

In accordance with one aspect of the present invention, the warning unit causes flashing of hazard lamps as the warning action. This alerts the mobile object that the mobile object is approaching the host vehicle. Thus, a signal can be given to the mobile object in order to cause the mobile object to take avoidance behavior such as deceleration or change of the path.

In accordance with one aspect of the present invention, the warning unit executes deceleration control as the warning action to decelerate the host vehicle. The warning action taken in this case causes the driver of the host vehicle to feel deceleration. Additionally, the speed at which the host vehicle approaches the mobile object is reduced. This prevents the host vehicle from approaching the mobile object excessively.

In accordance with one aspect of the present invention, the warning unit performs flashing of hazard lamps as a first stage of the warning action. If the host vehicle and the mobile object are closer to each other than when the first stage of the warning action is taken, the warning unit executes deceleration control as a second stage of the warning action to decelerate the host vehicle. The timing changing unit advances the timing of execution of each of the first stage of the warning action and the second stage of the warning action by a greater extent as the intersecting distance becomes shorter.

In this case, if the mobile object and the host vehicle approach each other, flashing of the hazard lamps is done as the first stage of the warning action. This alerts the mobile object that the mobile object is approaching the host vehicle.

If the host vehicle and the mobile object are closer to each other than when the first stage of the warning action is taken, and the risk of the approach becomes higher, the deceleration control is executed as the second stage of the warning action to decelerate the host vehicle. This warning action causes the driver of the host vehicle to feel of deceleration. Additionally, the speed at which the host vehicle approaches the mobile object is reduced. This prevents the host vehicle from approaching the mobile object excessively. Each of the first stage of the warning action and the second stage of the warning action is timed to be taken earlier as the intersecting distance becomes shorter. Thus, the first stage of the warning action and the second stage of the warning action are taken at an earlier stage in response to higher risk of approach.

In accordance with one aspect of the present invention, the warning unit causes flashing of the hazard lamps while the host vehicle is moving. If the host vehicle is in a stopped state, the mobile object and the host vehicle will not contact each other in the path of the host vehicle. Thus, like in this aspect, the following structure is applicable where flashing of the hazard lamps is done as the warning action while the host vehicle is moving.

In accordance with one aspect of the present invention, the warning unit causes flashing of the hazard lamps when the host vehicle in a stopped state is predicted to start moving. When the host vehicle in a stopped state starts moving, the host vehicle may contacts the mobile object in the path of the host vehicle. Thus, like in this aspect, the following structure is applicable where flashing of the hazard lamps is done as the warning action when the host vehicle in a stopped state is predicted to start moving. Whether the state will changed to a moving state is predicted based on the operated amount of the accelerator pedal or the brake pedal, or a brake negative pressure and the like, for example.

In accordance with one aspect of the present invention, the warning unit exerts control as the deceleration control to reduce output of a drive source mounted on the host vehicle. In this case, the reduction in the output of the drive source decelerates the host vehicle.

In accordance with one aspect of the present invention, the warning unit exerts control as the deceleration control to actuate a braking device of the host vehicle. In this case, the activation of the braking device of the host vehicle decelerates the host vehicle.

MODES FOR CARRYING OUT THE INVENTION

A vehicle warning device according to one embodiment of the present invention will be described below by referring to FIGS. 1 to 4. In the below, a vehicle on which the vehicle warning device is mounted is referred to as a host vehicle, and a vehicle existing around the "host vehicle" are referred to as another vehicle.

Figure 1:
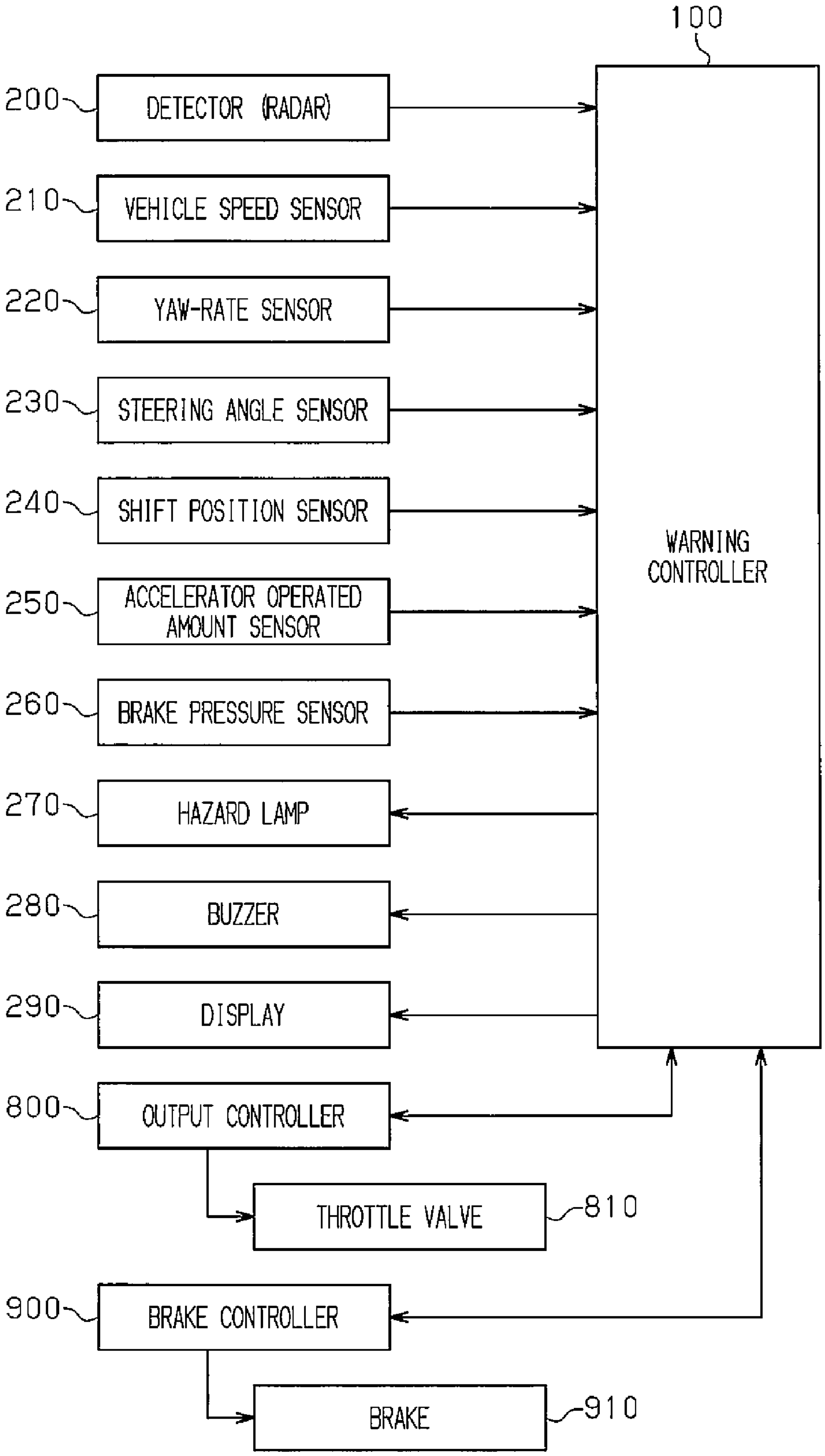
FIG. 1 is a diagrammatic view showing the system structure of an embodiment of the present invention.

As shown in FIG. 1, a warning controller 100 is mainly formed by a microcomputer including a central processing unit (CPU), a read-only memory (ROM) that stores in advance various programs, maps and the like, a random-access memory (RAM) that temporarily stores results of calculations by the CPU and the like, a timer counter, an input interface, and an outpour interface, for example.

The warning controller 100 is connected to a detector 200. The detector 200 is a detecting unit that detects another vehicle as a mobile object by using a microwave radar. The detector 200 measures the position, the moving direction, the speed and the like of other vehicles existing around the host vehicle. A device other than a microwave radar such as an ultrasonic sensor (sonar) is applicable as the detector 200. In the present embodiment, the detector 200 is provided in a bumper at the rear of the vehicle and intended to detect a mobile object behind the vehicle. With sufficiently high resolution of the detector 200, a mobile object smaller than a vehicle such as a human body can be detected.

The warning controller 100 is further connected to input devices including a vehicle speed sensor 210 that detects the speed of the host vehicle, a yaw-rate sensor 220 that detects the posture of the vehicle, a steering angle sensor 230 that detects the steering angle of the steering wheel, a shift position sensor 240 that detects the operated position of the shift lever, with which the transmission is operated, an accelerator operated amount sensor 250 that detects the operated amount of the accelerator pedal, and a brake pressure sensor 260 that detects the hydraulic pressure of the brake.

The warning controller 100 is connected to output devices including a drive circuit that causes hazard lamps 270 to flash, a buzzer 280 that generates warning sound, a display 290 for various visual outputs, and an indicator. As an example, a display of a navigation system may also be used as the display 290. The indicator is a device to flash or light up, and may be attached to an inner mirror, an outer mirror, or a combination meter and the like, for example.

The warning controller 100 is connected to an output controller 800 that controls the output of an internal combustion engine 15 mounted on the vehicle, and a brake controller 900 that controls the actuation of a brake 910 as the braking device of the vehicle. The output controller 800 controls the opening of a throttle valve 810 arranged on the intake passage of the internal combustion engine to control the output of the internal combustion engine. The brake controller 900 is connected to an actuator that actuates the brake forcibly. If the brake 910 is a hydraulic brake, this actuator can be a hydraulic pump that increases the brake hydraulic pressure, for example. If the brake 910 is an electrically-operated brake, this actuator can be an electric actuator such as a motor to actuate the brake.

A procedure of warning process performed to warn about approach of the host vehicle and a mobile object is described next by referring to FIGS. 2 to 4. The warning controller 100 performs the warning process shown in FIG. 2 at predetermined intervals.

When this process is started, it is determined first whether the detector 200 has detected a mobile object (S100). More specifically, as shown in FIG. 3, if the host vehicle 10 retreats in the direction of arrow R, it is determined whether the detector 200 at the rear of the host vehicle 10 has detected a mobile object such as another vehicle 20 moving in a direction (the direction of arrow F) intersecting a path L1 of the host vehicle 10. If such a mobile object has not been detected (S100: NO), this process is temporarily suspended.

On the other hand, if such a mobile object has been detected (S100: YES), an estimated intersecting distance X is calculated (S200).

Figures 3, 4:
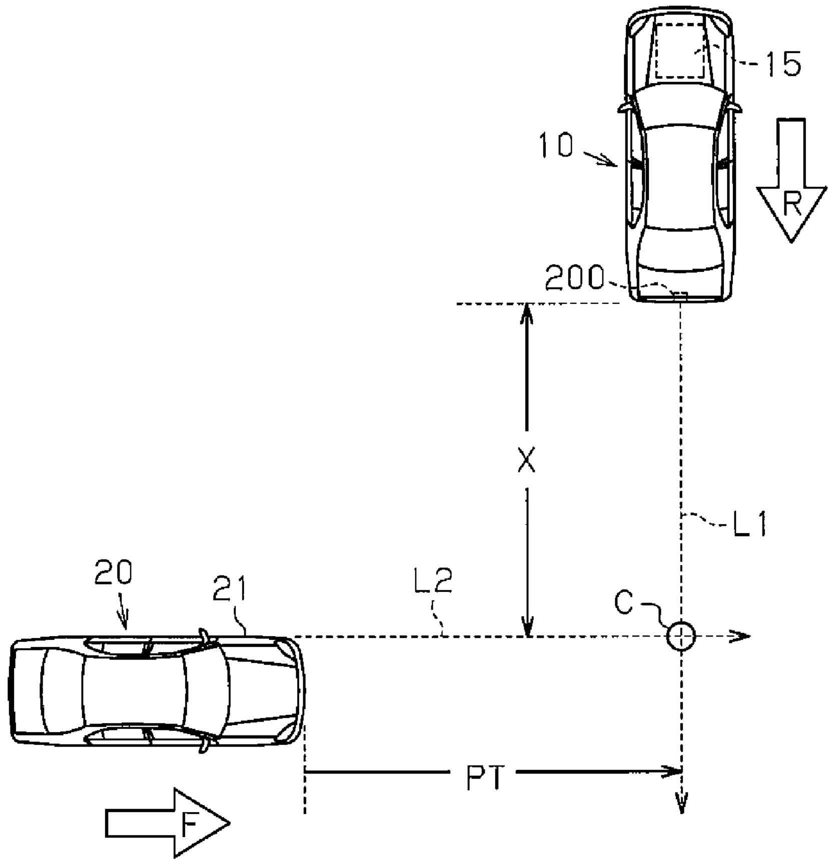
FIG. 3 is a conceptual diagram showing an estimated intersecting distance and an estimated intersecting time.
FIG. 4 is a conceptual diagram showing the relationship between a determination time and the estimated intersecting distance.

As shown in FIG. 3, the estimated intersecting distance X is the distance from to the rear end of the host vehicle a predicted intersecting position C of the path L1 along which the host vehicle 10 retreats and a path L2 of the other vehicle 20 (to be exact, the route of movement of a side surface 21 of the other vehicle 20 facing the host vehicle 10). The estimated intersecting distance X is calculated based on the position, the moving direction, and the speed of the other vehicle 20 detected by the detector 200, the speed of the host vehicle detected by the vehicle speed sensor 210, and the moving direction of the host vehicle detected by the yaw-rate sensor 220 or the steering angle sensor 230. The shorter the estimated intersecting distance X, the shorter the distance between the other vehicle 20 and the host vehicle 10 determined when the other vehicle 20 passes by the host vehicle 10 transversely. In this case, the risk for the other vehicle 20 and the host vehicle 10 to approach each other excessively is considered to be high. This process in step S200 corresponds to a process performed by a distance calculating unit.

Next, an estimated intersecting time PT is calculated (S300). The estimated intersecting time PT is the time left for the other vehicle 20 to reach the predicted intersecting position C from its current position. The estimated intersecting time PT is calculated based on the distance from the current position of the other vehicle 20 to the predicted intersecting position C, and the speed of the other vehicle 20. The shorter the estimated intersecting time PT, the shorter becomes the time left for the host vehicle 10 and the other vehicle 20 to approach each other. In this case, the risk of approach is considered to be high showing that the other vehicle 20 and the host vehicle 10 are close to each other. This process in step S300 corresponds to a process performed by a time calculating unit.

Next, a first threshold T1, a second threshold T2, and a third threshold T3 are set (S400) based on the estimated intersecting distance X calculated in step S200.

The first to third thresholds T1 to T3 are determination values to be compared to the estimated intersecting time PT calculated in step S300. As shown in FIG. 4, a determination time becomes longer in the following order: the first threshold T1, the second threshold T2, and the third threshold T3 (T1<T2<T3). The first threshold T1 is set variably such that the determination time of the first threshold T1 becomes longer as the estimated intersecting distance X becomes shorter (T1L>T1M>T1S). Likewise, the second threshold T2 is set variably such that the determination time of the second threshold T2 becomes longer as the estimated intersecting distance X becomes shorter (T2L>T2M>T2S). The third threshold T3 is also set variably such that the determination time of the third threshold T3 becomes longer as the estimated intersecting distance X becomes shorter (T3L>T3M>T3S). This process in step S400 corresponds to a process performed by a timing changing unit.

The first, second, and third thresholds T1, T2, and T3 are set in this way based on the estimated intersecting distance X. Next, it is determined whether the estimated intersecting time PT is the same as or shorter than the first threshold T1 (S500). The estimated intersecting time PT being the same as or shorter than the first threshold T1 (S500: YES) means that only a very short time is left for the host vehicle 10 and the other vehicle 20 to cross each other and the risk of approach is considerably high. Thus, deceleration control is exerted as a warning action to decelerate the host vehicle 10. More specifically, in step S800, automatic braking to forcibly actuate the brake 910 of the host vehicle 10 is applied to decelerate the host vehicle 10. Then, this process is temporarily suspended. When the automatic braking is applied, the aforementioned buzzer 280, the aforementioned display 290, or the indicator may be used to inform the driver of the host vehicle 10 of the fact that the warning action is being taken.

If the estimated intersecting time PT exceeds the first threshold T1 (S500: NO), it is determined whether the estimated intersecting time PT is the same as or shorter than the second threshold T2 (S600). The estimated intersecting time PT being the same as or shorter than the second threshold T2 (S600: YES) means that the time left for the host vehicle 10 and the other vehicle 20 to cross each other is relatively short and the risk of approach is relatively high. Thus, deceleration control is exerted as the warning action to decelerate the host vehicle 10. According to the deceleration control responsive to the positive determination made in step S600, the host vehicle 10 is decelerated more gently than the deceleration control responsive to the positive determination made in step S500. More specifically, according to the deceleration control responsive to the positive determination made in step S600, output suppressing process is performed that reduces the output of the internal combustion engine (S900). This output suppressing process fully closes the throttle valve 810. This process reduces an intake air quantity to reduce fuel to be fed to the engine, thereby reducing the output of the internal combustion engine. This output reduction decelerates the host vehicle 10. Then, this process is temporarily suspended. When the output suppressing process is performed, the aforementioned buzzer 280, the aforementioned display 290, or the indicator may be used to inform the driver of the host vehicle 10 of the fact that the warning action is being taken.

If the estimated intersecting time PT exceeds the second threshold T2 (S600: NO), it is determined whether the estimated intersecting time PT is the same as or shorter than the third threshold T3 (S700). If the estimated intersecting time PT exceeds the third threshold T3 (S700: NO), this process is temporarily suspended.

On the other hand, the estimated intersecting time PT being the same as or shorter than the third threshold T3 (S700: YES) means that the time left for the host vehicle 10 and the other vehicle 20 to cross each other is relatively long but there is still some degree of the risk for the other vehicle 20 and the host vehicle 10 to approach each other excessively. Thus, flashing of the hazard lamps 270 of the host vehicle 10 is done as the warning action, specifically the width indicator lamps of the host vehicle 10 are caused to flash (S1000). Then, this process is temporarily suspended. The flashing of the hazard lamps 270 may continue for a predetermined fixed time or until the other vehicle 20 finishes passing through the path of the host vehicle 10. When the hazard lamps 270 flash, the buzzer 280, the display 290, or the aforementioned indicator may be used to inform the driver of the host vehicle 10 of the fact that the warning action is being taken. The process in each of steps S500 to S1000 corresponds to process performed by a warning unit.

In this embodiment, as described above, the determination time is set to be longer in the following order: the first threshold T1, the second threshold T2, and the third threshold T3. Thus, as the estimated intersecting time PT becomes shorter, the warning action is taken in the following order: the flashing of the hazard lamps 270 in step S1000, the output suppressing process in step S900, and the application of the automatic braking in step S800.

Operation of the aforementioned warning process is described next.

If the other vehicle 20 moving in the direction intersecting the path L1 of the host vehicle 10 is detected, the estimated intersecting distance X is calculated first that is the distance to the host vehicle 10 from the predicted intersecting position C of the path L1 of the host vehicle 10 and the path L2 of the other vehicle 20.

Then, the estimated intersecting time PT is calculated that is the time left for the other vehicle 20 to reach the predicted intersecting position C. If the estimated intersecting time PT becomes the same as or shorter than the threshold (the first, second, or third threshold T1, T2, or T3), the host vehicle 10 and the other vehicle 20 are determined to be likely to approach each other excessively. In response, various warning actions are taken. As shown in FIG. 4, each of these thresholds is set at a longer time as the estimated intersecting distance X becomes shorter. As a result, in response to higher risk for the other vehicle 20 and the host vehicle 10 to approach each other excessively, the warning actions are taken at an earlier time.

As described above, as the estimated intersecting distance X becomes shorter, specifically, as a distance between the other vehicle 20 and the host vehicle becomes shorter when the other vehicle 20 passes by the host vehicle 10 transversely and the risk for the other vehicle 20 and the host vehicle 10 to approach each other excessively becomes higher, the warning action taken at an earlier time. Thus, measures such as those for avoiding approach of the other vehicle 20 and the host vehicle 10 can be taken at an earlier stage in response to higher risk of approach. As a result, when the other vehicle 20 moving in the direction intersecting the path L1 of the host vehicle 10 and the host vehicle approach each other, the warning action is timed to be taken appropriately. If the warning action is taken at an early stage while the risk of approach is not high, the driver of the host vehicle 10 might experience a feeling of strangeness. In this regard, in this embodiment, the warning action is taken at appropriate timing in response to the risk of approach. This reduces the strangeness the driver might feel.

If the estimated intersecting time PT is determined to be the same as or shorter than the third threshold T3, flashing of the hazard lamps 270 is done as a first stage of the warning action. This alerts the other vehicle 20 that the other vehicle 20 is approaching the host vehicle 10. Thus, a signal can be given to the other vehicle 20 in order to cause the other vehicle 20 to take avoidance behavior such as deceleration or change of the path.

If the estimated intersecting time PT is the same as or shorter than the second threshold T2 or T1 shorter than the third threshold T3, specifically if the host vehicle 10 and the other vehicle 20 are closer to each other than when the first stage of the warning action is taken, deceleration control is performed as a second stage of the warning action to decelerate the host vehicle 10. The deceleration control exerted as the warning action makes the driver of the host vehicle 10 to experience feeling of deceleration. Additionally, the deceleration control reduces the speed at which the host vehicle 10 approaches the other vehicle 20. This prevents the host vehicle 10 from approaching the other vehicle 20 excessively.

In particular, in this embodiment, if the estimated intersecting time PT is the same as or shorter than the second threshold T2, which is shorter than the third threshold T3, the aforementioned output suppressing process is performed as first deceleration control. If the estimated intersecting time PT is the same as or shorter than the first threshold T1, which is shorter than the second threshold T2, the host vehicle 10 and the other vehicle 20 can be determined to be even closer to each other so they are in higher risk of approach. In response, application of automatic braking is done as second deceleration control to further decelerate the host vehicle 10. This application of the automatic braking significantly reduces the speed at which the host vehicle 10 approaches the other vehicle 20.

In taking such various warning actions, each threshold is set longer as the estimated intersecting distance X becomes shorter. Thus, as the estimated intersecting distance X becomes shorter, the first stage of the warning action and the second stage of the warning action are taken at an earlier time. As a result, as the estimated intersecting distance X becomes shorter so that the risk of approach of the host vehicle 10 and the other vehicle 20 becomes higher, the first stage of the warning action and the second stage of the warning action are taken at an earlier stage. This makes it possible to properly secure the time for preventing the host vehicle 10 and the other vehicle 20 from approaching each other, for example.

As described above, the present embodiment achieves the following advantages.

(1) If the other vehicle 20 moving in the direction intersecting the path L1 of the host vehicle 10 is detected, the estimated intersecting distance X is calculated, which is the distance from the predicted intersecting position C of the path L1 of the host vehicle 10 and the path L2 of the other vehicle 20 to the host vehicle 10. The warning action is timed to be taken earlier as the estimated intersecting distance X becomes shorter. Thus, when the other vehicle 20 moving in the direction intersecting the path L1 of the host vehicle 10 and the host vehicle 10 approach each other, the warning action can be taken at appropriate timing. If the warning action is taken at an early stage while the risk of approach of the other vehicle 20 and the host vehicle 10 is not high, the driver of the host vehicle 10 might experience a feeling of strangeness. In this regard, in this embodiment, the warning action is timed to be taken appropriately in response to the risk of approach. This reduces strangeness the driver might experience.

(2) The estimated intersecting time PT is calculated, which is the time left for the other vehicle 20 to reach the predicted intersecting position C. If the estimated intersecting time PT is the same as or shorter than a given threshold, the warning action is taken. This threshold is set variably such that it becomes a longer time as the estimated intersecting distance X becomes shorter. As a result, in response to higher risk for the other vehicle 20 and the host vehicle 10 to approach each other excessively, the warning action can be timed to be taken earlier.

(3) Flashing of the hazard lamps 270 is done as the first stage of the warning action. This alerts the other vehicle 20 that the other vehicle 20 is approaching the host vehicle 10.

If the host vehicle 10 and the other vehicle 20 are closer to each other than when the first stage of the warning action is taken, deceleration control is performed as the second stage of the warning action to decelerate the host vehicle 10. This warning action causes the driver of the host vehicle 10 to experience a feeling of deceleration. Additionally, this warning action reduces the speed at which the host vehicle 10 approaches the other vehicle 20. This prevents the host vehicle 10 from approaching the other vehicle 20 excessively.

Each threshold is changed such that the first stage of the warning action and the second stage of the warning action are each timed to be taken earlier as the estimated intersecting distance X becomes shorter. As a result, as the risk of approach becomes higher, the first stage of the warning action and the second stage of the warning action are taken at an earlier stage.

(4) As the aforementioned deceleration control, the control of reducing the output of the internal combustion engine 15 mounted on the host vehicle 10 is performed. Thus, executing the deceleration control reduces the output of the internal combustion engine 15, so that the host vehicle 10 will be decelerated.

(5) Also as the aforementioned deceleration control, the control of applying automatic braking to actuate the brake 910 of the host vehicle 10 is performed. Thus, executing the deceleration control actuates the brake 910 of the host vehicle 10. This decelerates the host vehicle 10 by a greater extent than when the host vehicle 10 is decelerated by the aforementioned output suppressing process.

The aforementioned embodiment may be modified as follows.

If flashing of the hazard lamps 270 is done as the warning action, a condition for this flashing may be added. As an example, if the host vehicle 10 is in a stopped state, the other vehicle 20 and the host vehicle 10 will not contact each other in the path L1 of the host vehicle 10. Thus, the hazard lamps 270 may be caused to flash while the host vehicle 10 is moving.

If the host vehicle 10 in a stopped state starts moving, the host vehicle 10 may contact the other vehicle 20 in the path L1 of the host vehicle 10. The hazard lamps may be caused to flash if it is predicted that the host vehicle 10 in a stopped state will start moving.

Figure 2:
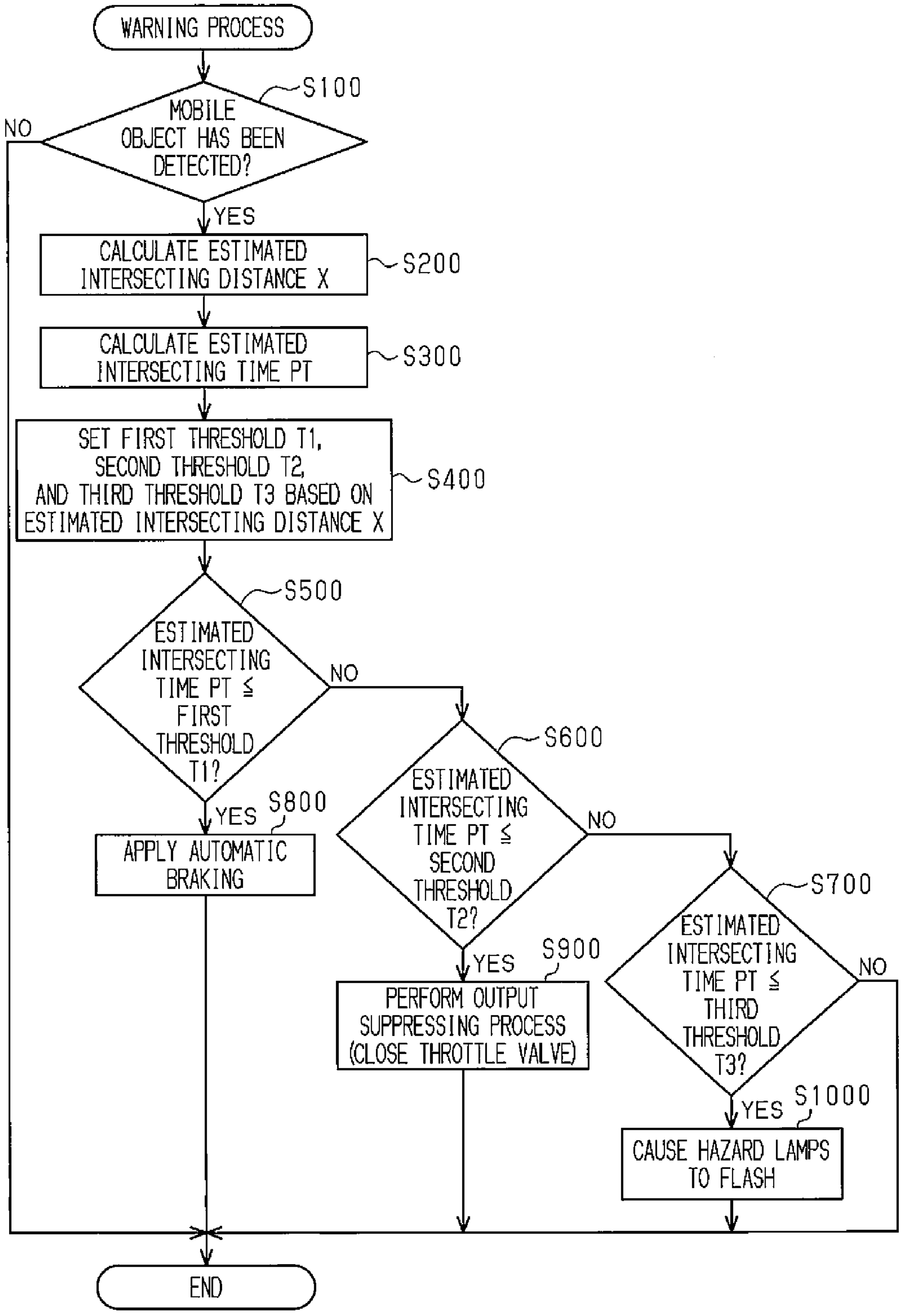
FIG. 2 is a flowchart showing a procedure of warning process in the embodiment.
Figure 5:
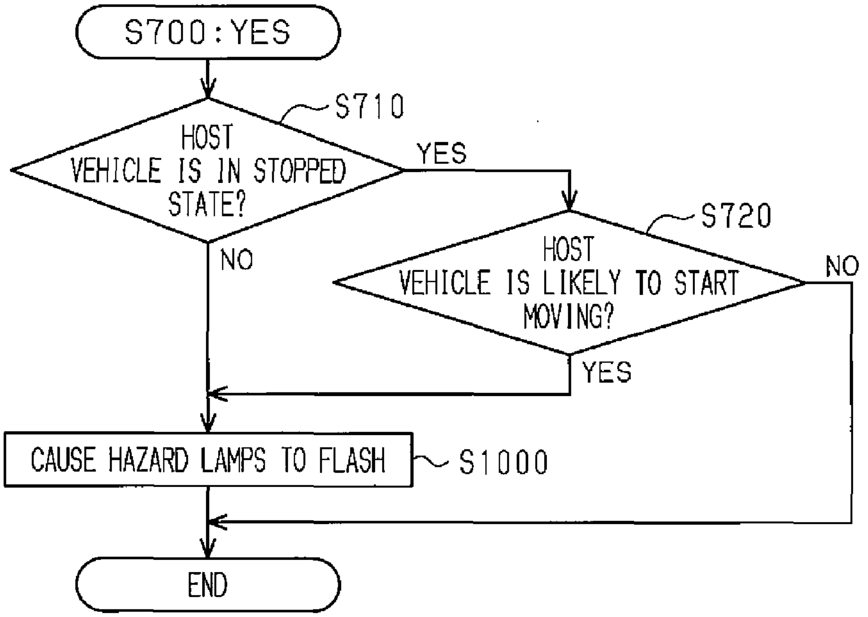
FIG. 5 is a flowchart relating to warning process in a modification of the embodiment, showing part of a procedure of the warning process.

This modification can be implemented by adding new steps S710 and S720 to the warning process of FIG. 2 described above. Specifically, as shown in FIG. 5, if the estimated intersecting time PT is determined to be the same as or shorter than the third threshold T3 in step S700 of FIG. 2 described above, it is determined whether the host vehicle 10 is in a stopped state based on the detected value of the vehicle speed sensor 210, for example (S710). If the host vehicle 10 is determined not to be in a stopped state, specifically if the host vehicle 10 is determined to be moving (S710: NO), the aforementioned process in step S1000 is performed to cause the hazard lamps 270 to flash.

If the host vehicle 10 is determined to be in a stopped state (S710: YES), it is determined whether the host vehicle 10 is likely to start moving (S720). This determination in step S720 can be made when necessary. As an example, the host vehicle 10 can be determined to be likely to start moving if change in the operated amount of the accelerator pedal to a value greater than 0 is detected based on the detection value of the accelerator operated amount sensor 250 and the like. The host vehicle 10 can also be determined to be likely to start moving if the operated amount of the brake pedal stepped on for maintaining the host vehicle 10 in a stopped state is reduced or if the brake pressure becomes lower to reduce the braking force of the brake 910.

If the host vehicle 10 is determined to be unlikely to start moving (S720: NO), the warning process is temporarily suspended without causing the hazard lamps 270 to flash. If the host vehicle 10 is determined to be likely to start moving (S720: YES), the host vehicle 10 in a stopped state is predicted to start moving. Thus, the aforementioned process in step S1000 is performed to cause the hazard lamps 270 to flash. Then, the warning process is temporarily suspended.

If it is determined in step S100 of FIG. 2 described above that a mobile object has been detected, the buzzer aforementioned 280, the aforementioned display 290, or the indicator may be used to inform the driver of the host vehicle 10 of the detection of the mobile object (other vehicle). As an example, if it is determined in step S100 that the mobile object has been detected, the aforementioned buzzer 280, the aforementioned display 290, or the indicator may be used to inform the driver of the detection before the estimated intersecting time PT and each threshold is compared. Further, if the estimated intersecting time PT is determined to have exceeded the third threshold T3 in step S700, the aforementioned buzzer 280, the aforementioned display 290, or the indicator may be used to inform the driver of the excess.

Figure 6:
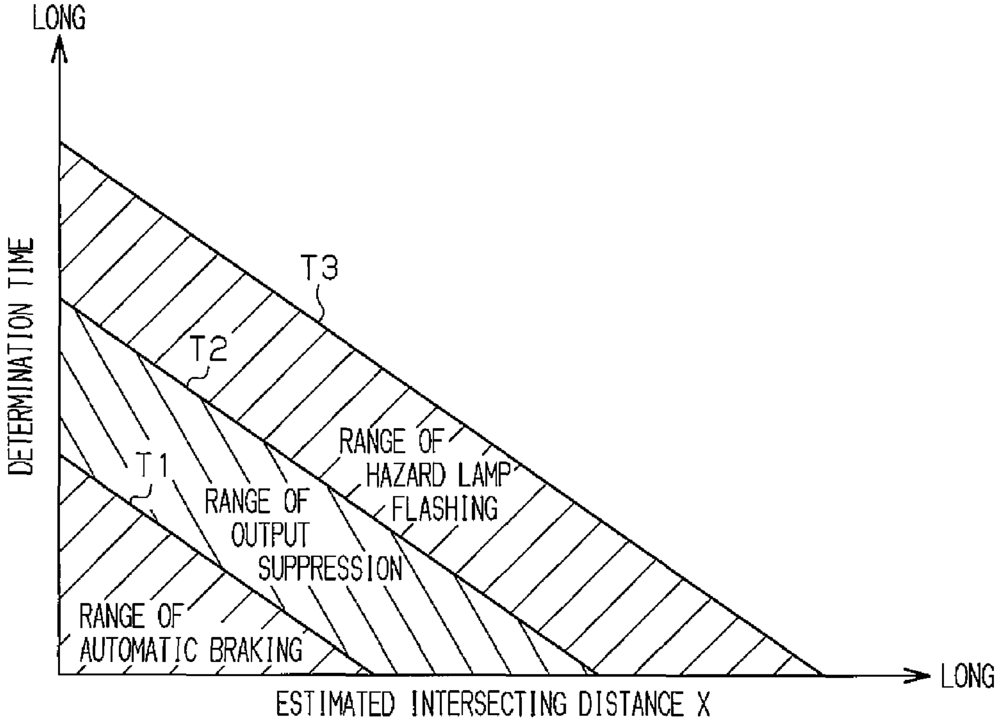
FIG. 6 is a conceptual diagram showing the relationship between a determination time and an estimated intersecting distance in a modification of the embodiment.

The first, second, and third thresholds T1, T2, and T3 may be changed continuously according to the length of the estimated intersecting distance X. As an example, as shown in FIG. 6, with the same estimated intersecting distance X, a determination time is set to be longer in the following order: the first threshold T1, the second threshold T2, and the third threshold T3. The first threshold T1 is set variably such that a determination time set as the first threshold T1 becomes longer as the estimated intersecting distance X becomes shorter. The second threshold T2 is also set variably such that a determination time set as the second threshold T2 becomes longer as the estimated intersecting distance X becomes shorter. The third threshold T3 is also set variably such that a determination time set as the third threshold T3 becomes longer as the estimated intersecting distance X becomes shorter. This modification can set each of the thresholds more precisely according to the length of the estimated intersecting distance X.

The warning action may include only flashing of the hazard lamps 270 or only the aforementioned various types of deceleration control.

The warning action may include only flashing of the hazard lamps 270 and the aforementioned output suppressing process. Alternatively, the warning action may also include only flashing of the hazard lamps 270 and the aforementioned application of automatic braking. Still alternatively, the warning action may include only the aforementioned output suppressing process or the aforementioned application of automatic braking.

Figure 7:
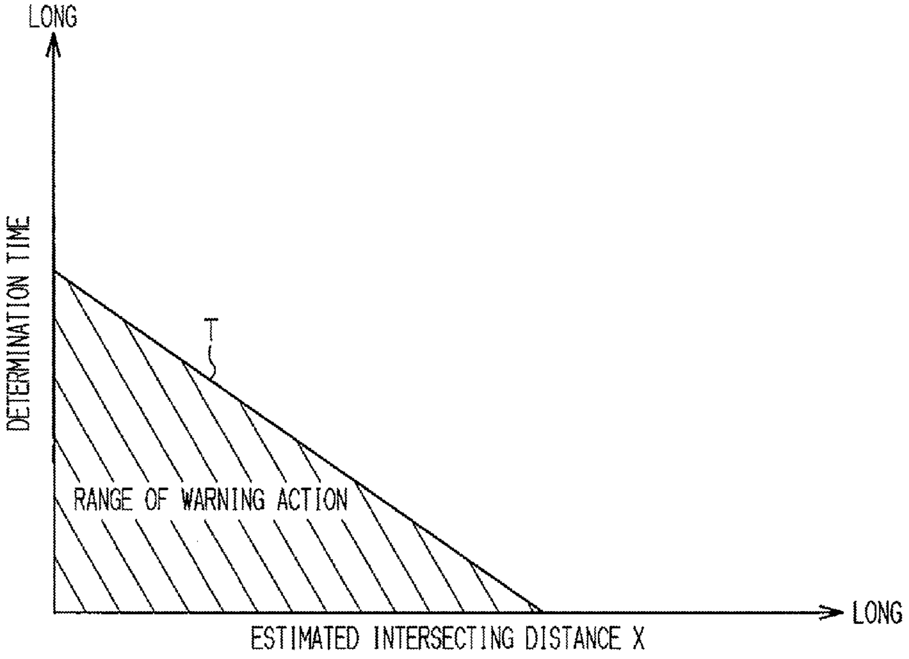
FIG. 7 is a conceptual diagram showing a range of a warning action in a modification of the embodiment.
Figure 8:
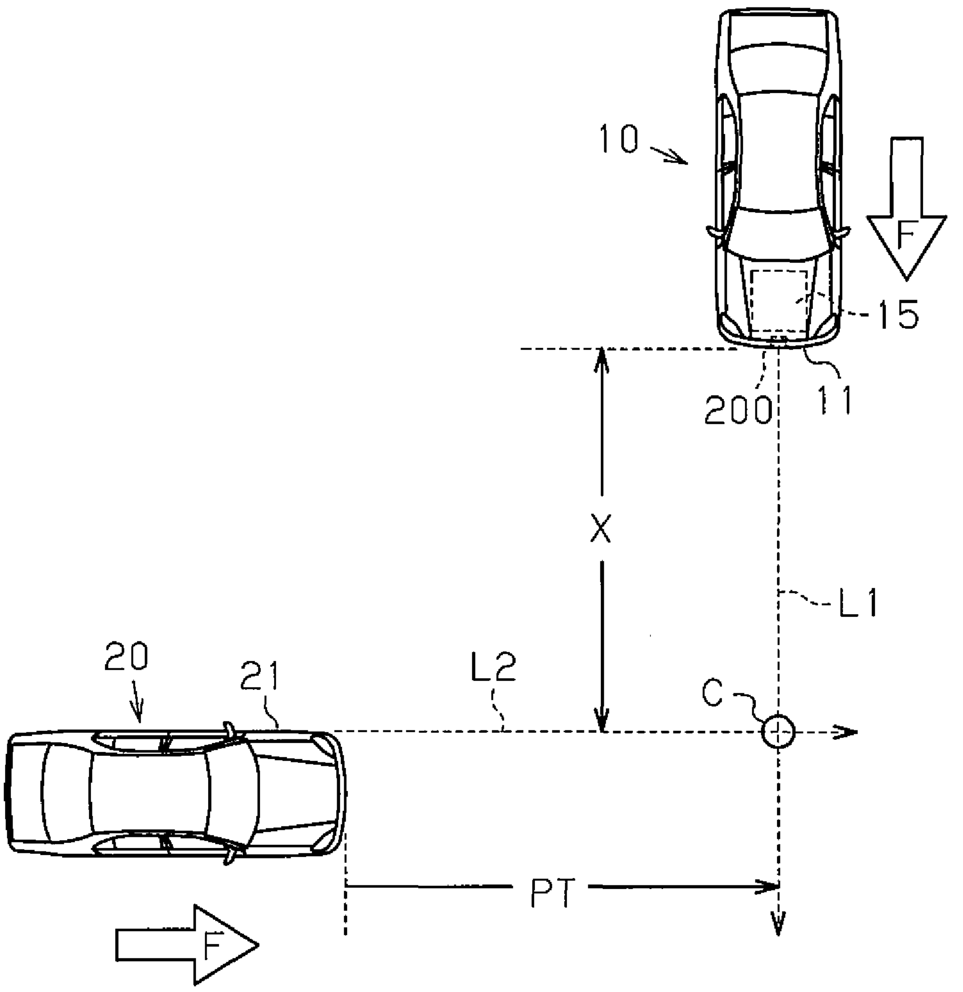
FIG. 8 is a conceptual diagram showing the position where a detecting unit is attached in a modification of the embodiment.

As the estimated intersecting time PT becomes shorter, the warning action is taken in the following order: flashing of the hazard lamps 270, the output suppressing process, and the application of automatic braking. The warning action may include multiple processes to be performed simultaneously. As shown in FIG. 7, a threshold T comparable to the aforementioned first to third thresholds T1 to T3 is set, for example. Specifically, the threshold T is set such that a determination time of the threshold T becomes longer as the estimated intersecting distance X becomes shorter. A warning action is taken if the estimated intersecting time PT is the same as or shorter than the threshold T. Any one of the following (A) to (D) can be selected to determine warning actions to be performed simultaneously in this case:

(A) Flashing of the hazard lamps 270 and the output suppressing process;

(B) Flashing of the hazard lamps 270 and application of automatic braking;

(C) The output suppressing process and application of automatic braking; and (D) Flashing of the hazard lamps 270, the output suppressing process, and application of automatic braking.

The throttle valve 810 is fully closed in the output suppressing process. Instead of fully closing the throttle valve 810, the opening of the throttle valve 810 may be made smaller than that of the throttle valve 810 before the output suppressing process is performed. This can still reduce the output of the internal combustion engine 15 compared to the output before the output suppressing process is performed. The output of the engine may also be reduced by adjusting a quantity to control the engine different from the opening of the throttle valve 810. Such a different quantity to control the engine may include for example ignition timing, a recirculation quantity of exhaust gas, or supercharging efficiency of a supercharger.

If a drive source mounted on the host vehicle 10 is an electric motor, power to be fed to the electric motor may be reduced to reduce the output of the drive source, thereby decelerating the host vehicle 10.

As the deceleration control, a deceleration method other than by the aforementioned reducing the output of the drive source or actuating a brake may be employed. As an example, the transmission gear ratio of the transmission provided between the drive source and the drive wheels may be changed to increase the drive resistance of the drive wheels, thereby decelerating the host vehicle 10.

The aforementioned output suppressing process may be performed only when the accelerator pedal is being operated. Whether the accelerator pedal is being operated can be determined based on the detection value of the accelerator operated amount sensor 250.

The aforementioned application of automatic braking may be done only if the braking force of the brake 910 is determined to be insufficient even though the other vehicle 20 is approaching the host vehicle 10. As an example, if the estimated intersecting time PT is determined to be the same as or shorter than the first threshold in step S500 of FIG. 2 described above, whether the braking force is insufficient is determined based on the detection value of the brake pressure sensor 260. If the braking force is determined to be insufficient, automatic braking may be applied in step S800. Insufficiency of the braking force can be determined based on not only the detection value of the brake pressure sensor 260 but also on the operated amount of the brake pedal, for example.

The warning action may include an action other than the aforementioned flashing of the hazard lamps 270, output suppressing process, and application of automatic braking.

The estimated intersecting time PT is calculated to determine whether the host vehicle 10 and the other vehicle 20 approach each other to such a degree as will necessitate the warning action. The approach may be determined in a different aspect. As an example, the distance from the current position of the other vehicle 20 to the predicted intersecting position C may be calculated. This calculated distance may be used as a substitute for the estimated intersecting time PT.

The vehicle warning device of the aforementioned embodiment includes the detector 200 provided in the bumper at the rear of the host vehicle 10. The detector 200 is adapted for detecting a mobile object behind the host vehicle 10. Alternatively, the detector 200 may be provided in the front (front bumper or the front grille, for example) of the host vehicle 10 to detect a mobile object in front of the host vehicle 10. Even in this case, the same advantages as those of the aforementioned embodiment are achieved.

DESCRIPTION OF THE REFERENCE NUMERALS

10 Host vehicle
20 Another vehicle
15 Internal combustion engine
100 Warning controller
200 Detector
210 Vehicle speed sensor
220 Yaw-rate sensor
230 Steering angle sensor
240 Shift position sensor
250 Accelerator operated amount sensor
260 Brake pressure sensor
280 Buzzer
270 Hazard lamp
290 Display
800 Output controller
810 Throttle valve
900 Brake controller
910 Brake

The invention claimed is:

1. A vehicle warning device comprising:
a detecting unit that detects a mobile object moving in a direction intersecting a path of a host vehicle;
a distance calculating unit that calculates an intersecting distance that is a distance to the host vehicle from a predicted intersecting position of the path of the host vehicle and a path of the mobile object;
a warning unit that takes a warning action if the host vehicle and the mobile object approach each other; and
a timing changing unit that advances the timing of execution of the warning action by a greater extent as the intersecting distance becomes shorter.

2. The vehicle warning device according to claim 1, comprising a time calculating unit that calculates an intersecting time that is a time left for the mobile object to reach the predicted intersecting position, wherein
the warning unit takes the warning action if the intersecting time is the same as or shorter than a threshold, and
the timing changing unit sets the threshold such that the shorter the intersecting distance, the longer the threshold becomes.

3. The vehicle warning device according to claim 1, wherein the warning unit causes flashing of hazard lamps as the warning action.

4. The vehicle warning device according to claim 1, wherein the warning unit executes deceleration control as the warning action to decelerate the host vehicle.

5. The vehicle warning device according to claim 1, wherein
the warning unit performs flashing of hazard lamps as a first stage of the warning action,
if the host vehicle and the mobile object are closer to each other than when the first stage of the warning action is taken, the warning unit executes deceleration control as a second stage of the warning action to decelerate the host vehicle, and
the timing changing unit advances the timing of execution of each of the first stage of the warning action and the second stage of the warning action by a greater extent as the intersecting distance becomes shorter.

6. The vehicle warning device according to claim 3, wherein the warning unit causes flashing of the hazard lamps while the host vehicle is moving.

7. The vehicle warning device according to claim 3, wherein the warning unit causes flashing of the hazard lamps when the host vehicle in a stopped state is predicted to start moving.

8. The vehicle warning device according to claim 4, wherein the warning unit exerts control as the deceleration control to reduce output of a drive source mounted on the host vehicle.

9. The vehicle warning device according to claim 4, wherein the warning unit exerts control as the deceleration control to actuate a braking device of the host vehicle.

10. The vehicle warning device according to claim 5, wherein the warning unit causes flashing of the hazard lamps while the host vehicle is moving.

11. The vehicle warning device according to claim 5, wherein the warning unit causes flashing of the hazard lamps when the host vehicle in a stopped state is predicted to start moving.

12. The vehicle warning device according to claim 5, wherein the warning unit exerts control as the deceleration control to reduce output of a drive source mounted on the host vehicle.

13. The vehicle warning device according to claim 5, wherein the warning unit exerts control as the deceleration control to actuate a braking device of the host vehicle.

* * * * *